(12) United States Patent
Kunihiro et al.

(10) Patent No.: US 10,875,575 B2
(45) Date of Patent: Dec. 29, 2020

(54) STEERING ASSISTANCE DEVICE

(71) Applicant: TOYOTA JIDOSHA KABUSHIKI KAISHA, Toyota (JP)

(72) Inventors: Yoji Kunihiro, Susono (JP); Yoshio Kudo, Machida (JP); Takahiro Kojo, Gotemba (JP); Yutaka Aoki, Miyoshi (JP); Ryo Irie, Okazaki (JP); Satoshi Takahashi, Susono (JP); Masateru Amano, Shizuoka-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/047,635

(22) Filed: Jul. 27, 2018

(65) Prior Publication Data
US 2019/0071125 A1 Mar. 7, 2019

(30) Foreign Application Priority Data
Sep. 4, 2017 (JP) ................. 2017-169473

(51) Int. Cl.
B62D 15/02 (2006.01)
B62D 1/28 (2006.01)
G01L 5/22 (2006.01)
B60W 10/20 (2006.01)
B60W 30/02 (2012.01)
(Continued)

(52) U.S. Cl.
CPC ........... *B62D 15/025* (2013.01); *B62D 1/286* (2013.01); *G01L 5/221* (2013.01); *B60W 10/20* (2013.01); *B60W 30/02* (2013.01); *B60W 30/18145* (2013.01); *B60W 40/072* (2013.01); *B60W 2050/046* (2013.01); *B60W 2420/52* (2013.01); *B62D 6/10* (2013.01); *B62D 15/021* (2013.01)

(58) Field of Classification Search
CPC .................................................. B62D 15/025
See application file for complete search history.

(56) References Cited

U.S. PATENT DOCUMENTS 6,212,452 B1    4/2001  Shimizu et al.
2005/0267661 A1  12/2005  Iwazaki et al.
(Continued)

FOREIGN PATENT DOCUMENTS

JP       11-78936 A      3/1999
JP    2005-122274 A      5/2005
(Continued)

*Primary Examiner* — Nicholas K Wiltey
*Assistant Examiner* — Tiffany K Luu
(74) *Attorney, Agent, or Firm* — Sughrue Mion, PLLC

(57) ABSTRACT

A steering assistance device includes a steering wheel to which a driver of a vehicle inputs steering torque, a steering shaft connected to the steering wheel, a steering mechanism configured to convert a rotation of the steering shaft into a steering angle for steering target wheels, a steering actuator configured to drive the steering mechanism such that a steering angle corresponding to a command value is generated, a steering torque sensor configured to detect torque acting on the steering shaft, an information providing unit configured to provide road information of a scheduled passage area extending in a traveling direction of the vehicle, and an electronic control unit configured to control the steering actuator, based on an output of the steering torque sensor and the road information.

11 Claims, 9 Drawing Sheets

(51) Int. Cl.
*B60W 30/18* (2012.01)
*B60W 40/072* (2012.01)
*B60W 50/04* (2006.01)
*B62D 6/10* (2006.01)

(56) References Cited

U.S. PATENT DOCUMENTS

2015/0344066 A1* 12/2015 Tsubaki ................ B62D 1/286
                                                       701/41
2016/0176400 A1*  6/2016 Nakano ................ B62D 15/025
                                                       701/41
2018/0186372 A1*  7/2018 Shimizu .................. B62D 6/00

FOREIGN PATENT DOCUMENTS

| JP | 2005-343184 A | 12/2005 | | |
|---|---|---|---|---|
| JP | 2009-214680 A | 9/2009 | | |
| JP | 2015-020719 A | 2/2015 | | |
| WO | WO-2016208545 A1 * | 12/2016 | ............... | B62D 6/00 |

* cited by examiner

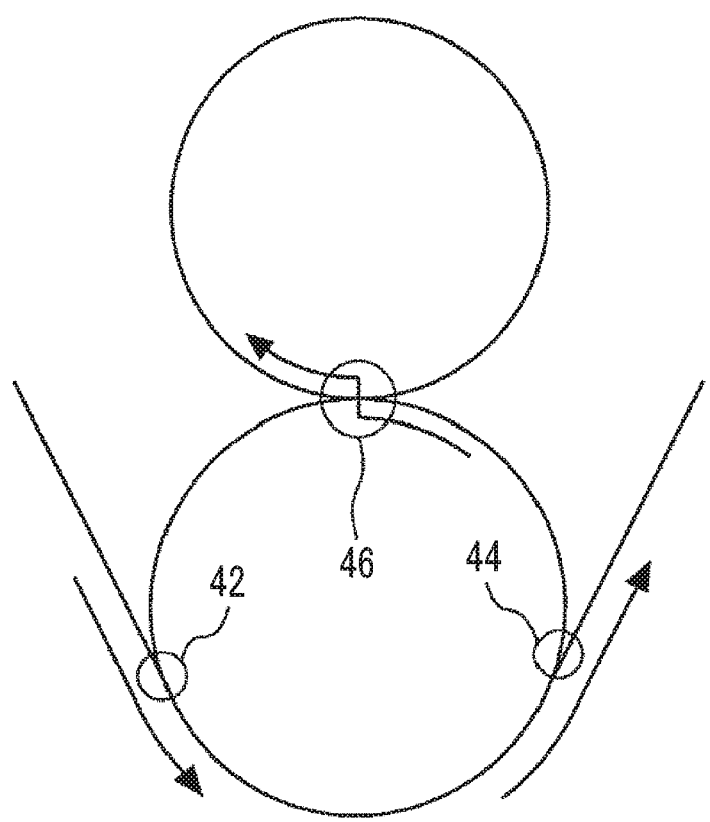

STEERING ASSISTANCE DEVICE

INCORPORATION BY REFERENCE

The disclosure of Japanese Patent Application No. 2017-169473 filed on Sep. 4, 2017 including the specification, drawings and abstract is incorporated herein by reference in its entirety.

BACKGROUND

1. Technical Field

The disclosure relates to a steering assistance device.

2. Description of Related Art

Japanese Unexamined Patent Application Publication No. 2005-343184 (JP 2005-343184 A) discloses a driving assistance device that performs assistance control relating to a steering operation. With the assistance control of the device, a steering angle of a vehicle is autonomously controlled. When steering torque exceeding a cancellation threshold value is input to a steering wheel during the execution of the assistance control, the assistance control is canceled and the sovereignty over for the steering operation is returned to a driver.

In the device of the related art, the cancellation threshold value is set to a larger value as the curvature of a road on which the vehicle is going to travel becomes larger. In a case where the driver of the vehicle personally performs a steering operation, steering torque that is input to the steering wheel increases as the curvature of a curve becomes larger. With the device of the related art, in a curve with a large curvature, the assistance control is not canceled unless sufficiently large steering torque is input. For this reason, according to the device, it is possible to appropriately avoid a situation where the assistance control is canceled against the intention of the driver.

In the device of the related art, the steering torque by the driver is detected by a steering torque sensor. The steering torque sensor detects torsional torque that is applied to a steering shaft, as the steering torque.

The steering shaft is connected to right and left front wheels via a steering gear box. A motor for providing a steering angle to the right and left front wheels is incorporated in the steering gear box.

During the execution of the assistance control, the device provides a desired steering angle to the right and left front wheels by appropriately driving the motor. At this time, the operation of the motor is also transmitted to the steering wheel via the gear box and the steering shaft. For this reason, when the steering angle is autonomously changed by the assistance control, an autonomous rotation occurs in the steering wheel as well. By the above, the driver can visually recognize that the steering angle is being autonomously controlled.

SUMMARY

Incidentally, when the steering wheel autonomously rotates during the execution of the assistance control, the inertia torque of the steering wheel acts on the steering shaft as a reaction force of the rotation. At this time, in spite of the fact that the driver has not input any steering torque, an output in response to the inertia torque appears in the steering torque sensor.

Under the circumstances as described above, a situation in which the detection value by the steering torque sensor exceeds the cancellation threshold value of the assistance control occurs merely due to input of a slight steering torque in addition to the inertia torque. When the situation occurs, the driving assistance device of the related art cancels the assistance control. As described above, the driving assistance device of the related art has the possibility of canceling the assistance control merely by input of s slight steering torque in a situation in which the inertia torque of the steering wheel acts on the steering torque sensor.

The disclosure provides a steering assistance device that allows steering assistance to be appropriately ended without being influenced by inertia torque of a steering wheel in a case where a driver intentionally inputs sufficient steering torque.

An aspect of the disclosure relates to a steering assistance device. The steering assistance device includes: a steering wheel to which a driver of a vehicle inputs steering torque; a steering shaft connected to the steering wheel; a steering mechanism configured to convert a rotation of the steering shaft into a steering angle for steering target wheels; a steering actuator configured to drive the steering mechanism such that a steering angle corresponding to a command value is generated; a steering torque sensor configured to detect torque acting on the steering shaft; an information providing unit configured to provide road information of a scheduled passage area extending in a traveling direction of the vehicle; and an electronic control unit configured to control the steering actuator, based on an output of the steering torque sensor and the road information. The electronic control unit is configured to execute steering assistance control that includes computing the command value for causing the vehicle to travel along the scheduled passage area, based on the road information, and providing the command value to the steering actuator, assistance cancellation processing that includes canceling execution of the steering assistance control when the output of the steering torque sensor has reached a level that establishes a cancellation condition, inertia prediction processing that includes predicting whether or not an inertia torque that is generated by the steering wheel under the steering assistance control exceeds a reference value, based on the road information, first condition setting processing that includes setting a first condition as the cancellation condition, in a situation in which the inertia torque is predicted not to exceed the reference value, and second condition setting processing that includes setting a second condition having an establishment condition that is stricter than in the first condition, as the cancellation condition, in a case where the inertia torque is predicted to exceed the reference value.

According to the aspect of the disclosure, when the driver of the vehicle operates the steering wheel, the steering torque associated with the operation is transmitted to the steering target wheels via the steering shaft and the steering mechanism. As a result, a steering angle that the driver desires is generated on the steering target wheels. At this time, the steering torque sensor outputs an output corresponding to the steering torque input by the driver. When the electronic control unit executes the steering assistance control, an appropriate steering angle is given to the steering target wheels by the steering actuator, based on the road information that is provided by the information providing unit. In a case where the output of the steering torque sensor has reached magnitude satisfying the cancellation condition during the execution of the steering assistance control, the execution of the steering assistance control is canceled and the sovereignty over for the steering operation is returned to the driver. Under the steering assistance control, when the steering angle changes, the influence of the inertia torque of the steering wheel appears at the output of the steering torque sensor. In the aspect of the disclosure, in a situation where the inertia torque is predicted not to exceed the reference value, the first condition is used as the cancellation condition. On the other hand, in a situation where the inertia torque is predicted to exceed the reference value, the second condition having an establishment condition that is stricter than in the first condition is set as the cancellation condition. In a situation where the second condition is set, the output of the steering torque sensor becomes a combined value of the inertia torque of the steering wheel and the steering torque by the driver. For this reason, there is a case where the output becomes larger than the steering torque by the driver by an amount corresponding to the inertia torque. In the aspect of the disclosure, in a case where large inertia torque is predicted, the second condition having a strict establishment condition is used. For this reason, according to the aspect of the disclosure, in a case where the driver intentionally inputs sufficient steering torque, without being influenced by the inertia torque, it is possible to appropriately cancel the execution of the steering assistance control.

In the aspect of the disclosure, the assistance cancellation processing may include processing of determining establishment of the cancellation condition in a case where the output of the steering torque sensor exceeds a cancellation threshold value. The first condition setting processing may include processing of setting a standard threshold value as the cancellation threshold value. The second condition setting processing may include processing of setting a large threshold value that is larger than the standard threshold value, as the cancellation threshold value.

According to the above configuration, further, whether or not the cancellation condition is established is determined depending on whether or not the output of the steering torque sensor exceeds the cancellation threshold value. Then, in the second condition, a large threshold value that is larger than the standard threshold value is used as the cancellation threshold value. For this reason, according to the aspect of the disclosure, the second condition can be set as a condition in which an establishment condition is stricter than in the first condition.

In the aspect of the disclosure, the large threshold value may be a value larger than the standard threshold value by a fixed value.

According to the above configuration, further, in the second condition, the large threshold value that is larger than the standard threshold value by a fixed value is set as the cancellation threshold value. According to the aspect of the disclosure, by the simple processing, it is possible to make the establishment condition of the second condition stricter than the establishment condition of the first condition.

In the aspect of the disclosure, the inertia prediction processing may include processing of predicting magnitude of the inertia torque, based on the road information. The second condition setting processing may include processing of computing a threshold value addition amount, based on the magnitude of the inertia torque, and processing of calculating the large threshold value by adding the threshold value addition amount to the standard threshold value.

According to the above configuration, further, the cancellation threshold value that is used in the second condition is a value larger than the standard threshold value by an amount corresponding to the predicted inertia torque. With the second condition as described above, it is possible to accurately cancel the influence of the inertia torque and correctly reflect the intention of the driver in the cancellation of the steering assistance control.

In the aspect of the disclosure, the assistance cancellation processing may include processing of determining whether or not the output of the steering torque sensor exceeds a cancellation threshold value, and processing of determining that cancellation condition is established in a case where an establishment time during which a state where the output exceeds the cancellation threshold value exceeds a cancellation threshold time. The first condition setting processing may include processing of setting a standard threshold time as the cancellation threshold time; and the second condition setting processing may include processing of setting a long threshold time that is longer than the standard threshold time, as the cancellation threshold time.

According to the above configuration, further, whether or not the cancellation condition is established is determined depending on whether or not the establishment time at which the output of the steering torque sensor exceeds the cancellation threshold value exceeds the cancellation threshold time. Then, in the second condition, the long threshold time that is longer than the standard threshold time is used as the cancellation threshold time. The cancellation condition is more difficult to be established as the cancellation threshold time is longer. For this reason, according to the aspect of the disclosure, the second condition can be set as a condition in which an establishment condition is stricter than in the first condition.

In the aspect of the disclosure, the first condition setting processing may include processing of measuring a duration time of a state where the inertia torque is equal to or less than a second reference value having a value equal to or less than the reference value, in a situation where the inertia torque is predicted not to exceed the reference value, and processing of determining whether or not the duration time exceeds a holding time. Processing of setting the first condition as the cancellation condition may be executed at a point in time when the duration time exceeds the holding time. The inertia prediction processing may include processing of predicting magnitude of the inertia torque, based on the road information. The electronic control unit may be configured to further execute processing of setting the holding time to be longer as the predicted magnitude of the inertia torque becomes larger.

According to the above configuration, further, the processing of setting the first condition as the cancellation condition is performed at the point in time when a state where the inertia torque is equal to or less than the second reference value exceeds the holding time. Therefore, the second condition that has been once set is maintained until the holding time elapses, even after a state where the inertia torque falls below the reference value is created. Then, in the aspect of the disclosure, the larger the predicted inertia torque is, the longer the holding time is set to be. It takes a longer time for the inertia torque of the steering sensor to converge to the reference value or less as the inertia torque of the steering sensor reaches a larger value. According to the aspect of the disclosure, the point in time when the second condition is reset to the first condition can be changed in accordance with the convergence period. For this reason, according to the aspect of the disclosure, it is possible to appropriately eliminate the influence of the inertia torque.

In the aspect of the disclosure, the inertia prediction processing may include processing of predicting steering angular acceleration that is requested for the vehicle, based on the road information, and processing of predicting magnitude of the inertia torque, based on the steering angular acceleration.

According to the above configuration, further, the magnitude of the inertia torque is predicted based on the steering angular acceleration that is predicted from the road information. The inertia torque that is generated by the steering wheel is mainly determined by the steering angular acceleration. For this reason, according to the aspect of the disclosure, it is possible to accurately predict the magnitude of the inertia torque.

In the aspect of the disclosure, the cancellation condition may include the same direction cancellation condition that is used for steering torque in the same direction as a direction of the inertia torque, and a reverse direction cancellation condition that is used for steering torque in a direction opposite to the direction of the inertia torque. The second condition may be set as the same direction cancellation condition.

According to the above configuration, further, in a case where the steering torque is in the same direction as the inertia torque, the same direction cancellation condition is used, and in a case where both the torques are in opposite directions, the reverse direction cancellation condition is used. Then, the second condition having a strict establishment condition is set as the same direction cancellation condition. When the steering torque is in the same direction as the inertia torque, an output corresponding to the sum of both the torques appears in the steering torque sensor. At this time, in the aspect of the disclosure, the cancellation of the steering assistance control is determined based on whether or not the sum satisfies the second condition. According to the determination, the execution of the steering assistance control can be canceled as intended by the driver by eliminating the influence of the steering torque.

In the aspect of the disclosure, the electronic control unit may be configured to further execute third condition setting processing of setting a third condition that is more easily established than the first condition, as the reverse direction cancellation condition, in the case where the inertia torque is predicted to exceed the reference value.

According to the above configuration, further, as the reverse direction cancellation condition, the third condition having a looser establishment condition is set. When the steering torque has a direction opposite to that of the inertia torque, the output of the steering torque sensor has a value corresponding to the subtraction value obtained by subtracting the inertia torque from the steering torque. At this time, in the aspect of the disclosure, the cancellation of the steering assistance control is determined based on whether or not the subtraction value satisfies the third condition. According to the determination, it is possible to appropriately cancel the execution of the steering assistance control by input of appropriate steering torque by the driver without being influenced by the inertia torque.

In the aspect of the disclosure, the information providing unit may include an object detection sensor configured to detect a target object indicating a boundary of a lane. The road information may include a detection result of the target object by the object detection sensor.

According to the above configuration, further, the object detection sensor can provide the detection result of the target object indicating the boundary of the lane to the electronic control unit as road information. In a case where the boundary of the lane can be detected in time series, the command value of the steering assistance control and the inertia torque of the steering wheel can be calculated. For this reason, the electronic control unit in the aspect of the disclosure can obtain information needed for the execution of the steering assistance control and the assistance cancellation processing from the object detection sensor.

In the aspect of the disclosure, the information providing unit may include a map information providing unit configured to provide map information of an area extending in the traveling direction of the vehicle. The road information may include map information on a road on which the vehicle has to travel.

According to the above configuration, further, the map information providing unit can provide map information of an area extending in the traveling direction of the vehicle to the electronic control unit as road information. The road information includes map information on a road on which the vehicle should travel. Then, in a case where the map information on the road on which the vehicle should travel can be obtained, the command value of the steering assistance control and the inertia torque of the steering wheel can be calculated. For this reason, the electronic control unit in the aspect of the disclosure can obtain information needed for the execution of the steering assistance control and the assistance cancellation processing from the map information providing unit.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a diagram for describing a traveling pattern in which the inertia torque of the steering wheel easily occurs.

DETAILED DESCRIPTION OF EMBODIMENTS

Embodiment

Configuration of Embodiment

Figure 1:
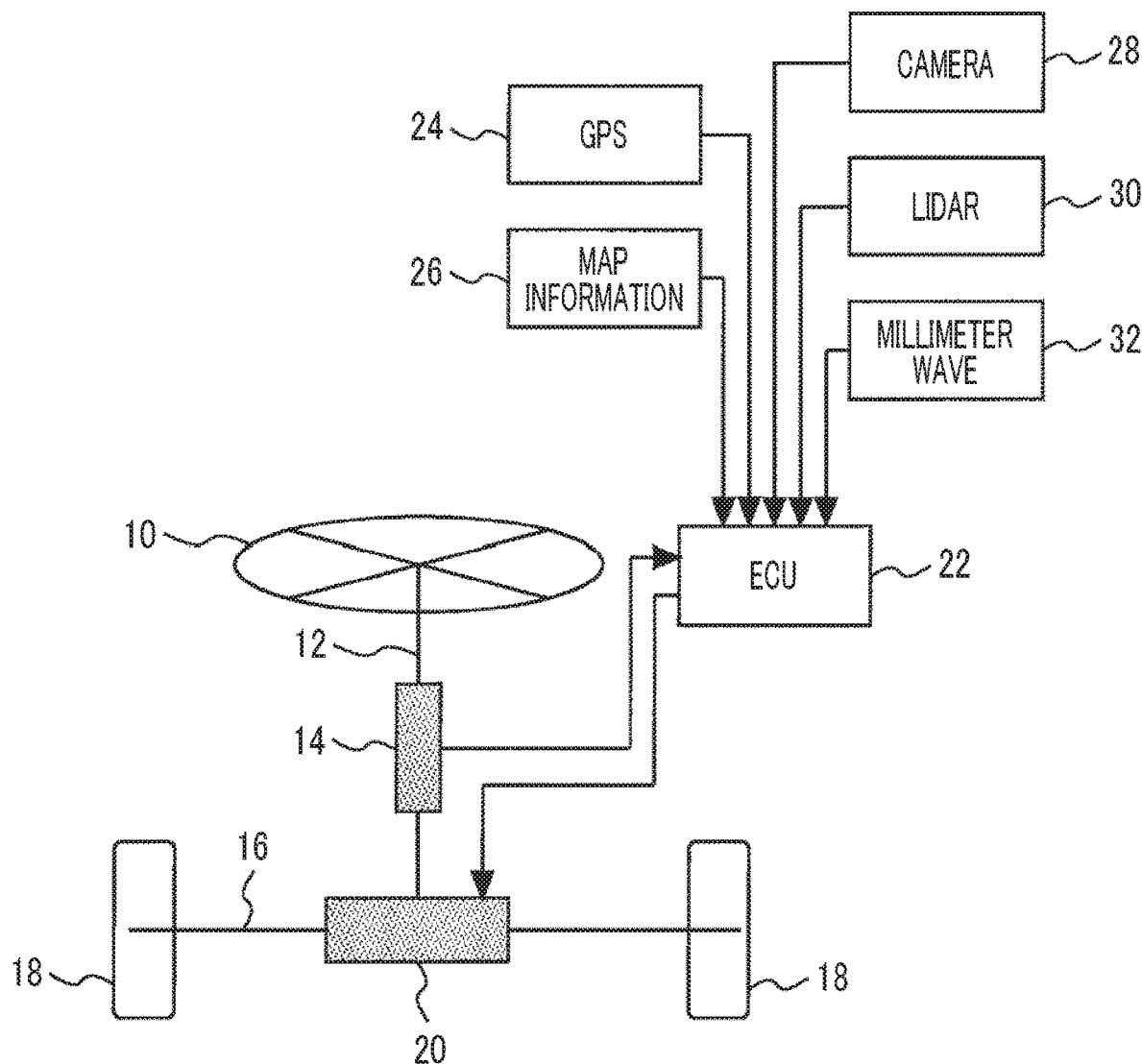
FIG. 1 is a diagram showing a configuration of an embodiment of the disclosure.

FIG. 1 is a diagram showing a configuration of a steering assistance device of an embodiment of the disclosure. The device shown in FIG. 1 is provided with a steering wheel 10. A driver of a vehicle can manipulate a steering angle of the vehicle by using the steering wheel.

A steering shaft 12 is connected to the steering wheel 10. A steering torque sensor 14 is mounted on the steering shaft 12. The steering torque sensor 14 outputs an output according to a torsion amount that is generated in the steering shaft 12. According to the output, the torque acting on the steering shaft 12 can be detected.

The steering shaft 12 is connected to a steering mechanism 16. The steering mechanism 16 is provided with a rod member that is connected to steering target wheels 18 (here, referred to as right and left front wheels) of the vehicle, and a gear mechanism for converting rotary motion of the steering shaft 12 into linear motion of the rod member.

A steering actuator 20 is mounted on the steering mechanism 16. The steering actuator 20 has a built-in electric motor and operates the steering mechanism 16 according to a command value that is provided from the outside. According to the steering actuator 20, it is possible to provide a steering angle according to the command value to the steering target wheels 18 regardless of an operation by the driver. The operation of the steering actuator 20 is transmitted not only to the steering target wheels 18 but also to the steering wheel 10. For this reason, when the steering actuator 20 changes the steering angle, an operation according to the change also appears in the steering wheel 10.

The device shown in FIG. 1 is provided with an electronic control unit (ECU) 22. The output of the steering torque sensor 14 (hereinafter referred to as "sensor torque") is given to the ECU 22. The ECU 22 can provide a command value according to the steering angle that should be realized to the steering actuator 20.

A global positioning system (GPS) unit 24 and a map information providing unit 26 are further connected to the ECU 22. The ECU 22 can know the current position of the vehicle, based on information that is provided from the GPS unit 24. The map information providing unit 26 provides map information of an area extending in a traveling direction of the vehicle to the ECU 22. The ECU 22 can detect the characteristics of the road extending in the traveling direction of the vehicle, specifically, the curvature of the road, the width of a lane, and the like, based on the map information.

In the device of this embodiment, the ECU 22 is provided with an object detection sensor for detecting various objects existing around the vehicle. Specifically, the device is provided with a camera 28, a laser imaging and detection ranging (LIDAR) unit 30, and a millimeter wave radar unit 32, as the object detection sensors. According to the object detection sensors described above, it is possible to detect an object representing the boundary of the lane, such as a white line or a guardrail on the road. The ECU 22 can also detect the curvature, the width, and the like of the road extending in the traveling direction of the vehicle, from the detection results of the object detection sensors.

Basic Operation of Device shown in FIG. 1

In this embodiment, a driver of the vehicle can request the ECU 22 to perform steering assistance control for lane keeping by using an input interface (not shown). When the steering assistance control is started, the ECU 22 firstly acquires information on the road extending in the traveling direction of the vehicle, based on information that is provided from the GPS unit 24 and the map information providing unit 26, or based on information that is provided from the object detection sensor such as the camera 28.

The ECU 22 calculates a target steering angle for causing the vehicle to autonomously travel along the road in a scheduled passage area, based on the acquired information on the road. Then, the ECU 22 provides a command value for realizing the target steering angle to the steering actuator 20. As a result, the steering angle for the steering target wheels 18 is controlled to the target steering angle and autonomous lane keeping is achieved.

In a case where the steering wheel is intentionally steered by the driver during the execution of the steering assistance control, the ECU 22 executes assistance cancellation processing for canceling the steering assistance control. Specifically, the ECU 22 monitors the output of the steering torque sensor 14, that is, the sensor torque, during the execution of the steering assistance control. Then, in a case where the sensor torque satisfying a predetermined cancellation condition is detected, a determination that the driver has intentionally performed a steering operation is made, and the execution of the steering assistance control is canceled. By the above, in a case where the driver has intentionally performed a steering operation, it is possible to promptly return the sovereignty over for the steering operation to the driver.

Inertia Torque of Steering Wheel

Figure 2:
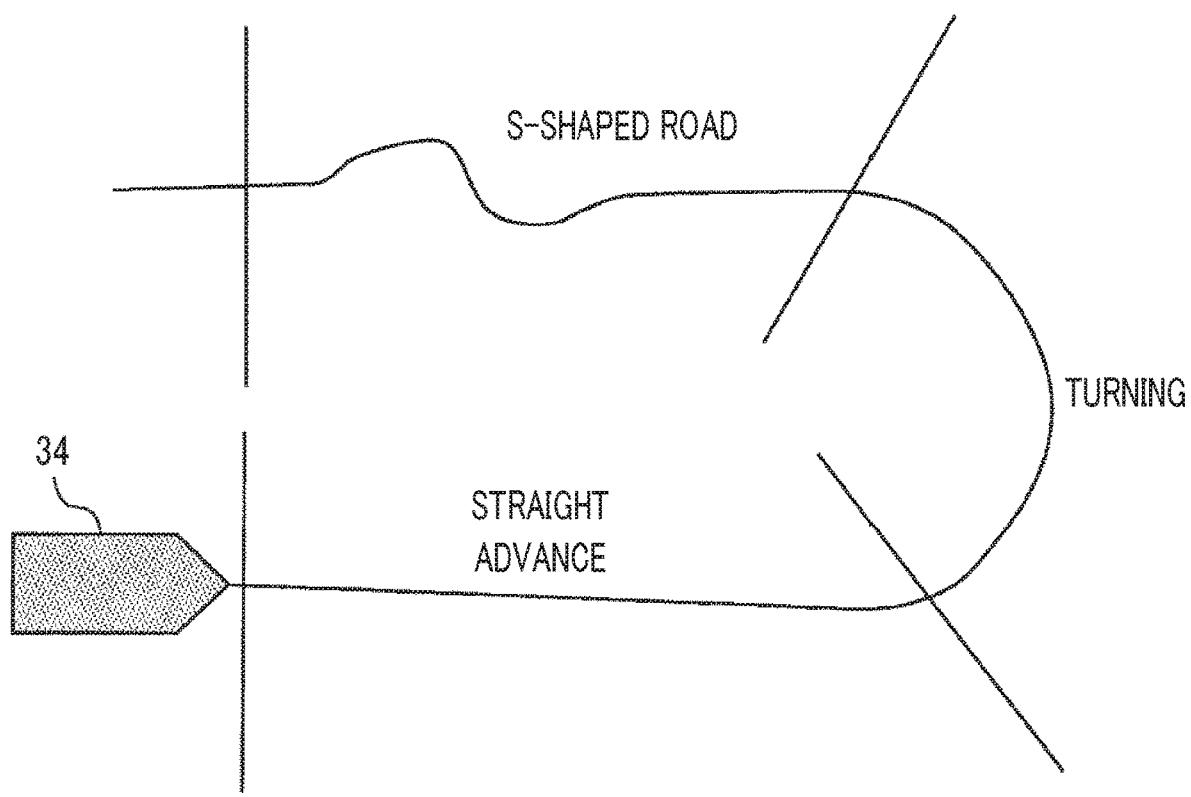
FIG. 2 shows an example of a traveling road of a vehicle equipped with a steering assistance device shown in FIG. 1.

FIG. 2 is a diagram showing an example of a traveling route of a vehicle 34 equipped with the steering assistance device of this embodiment. According to the traveling route shown in FIG. 2, the vehicle 34 enters a turning road following a straight road. Then, after passing through the turning road, the vehicle 34 travels on an S-shaped road via a short straight road.

Figure 3:
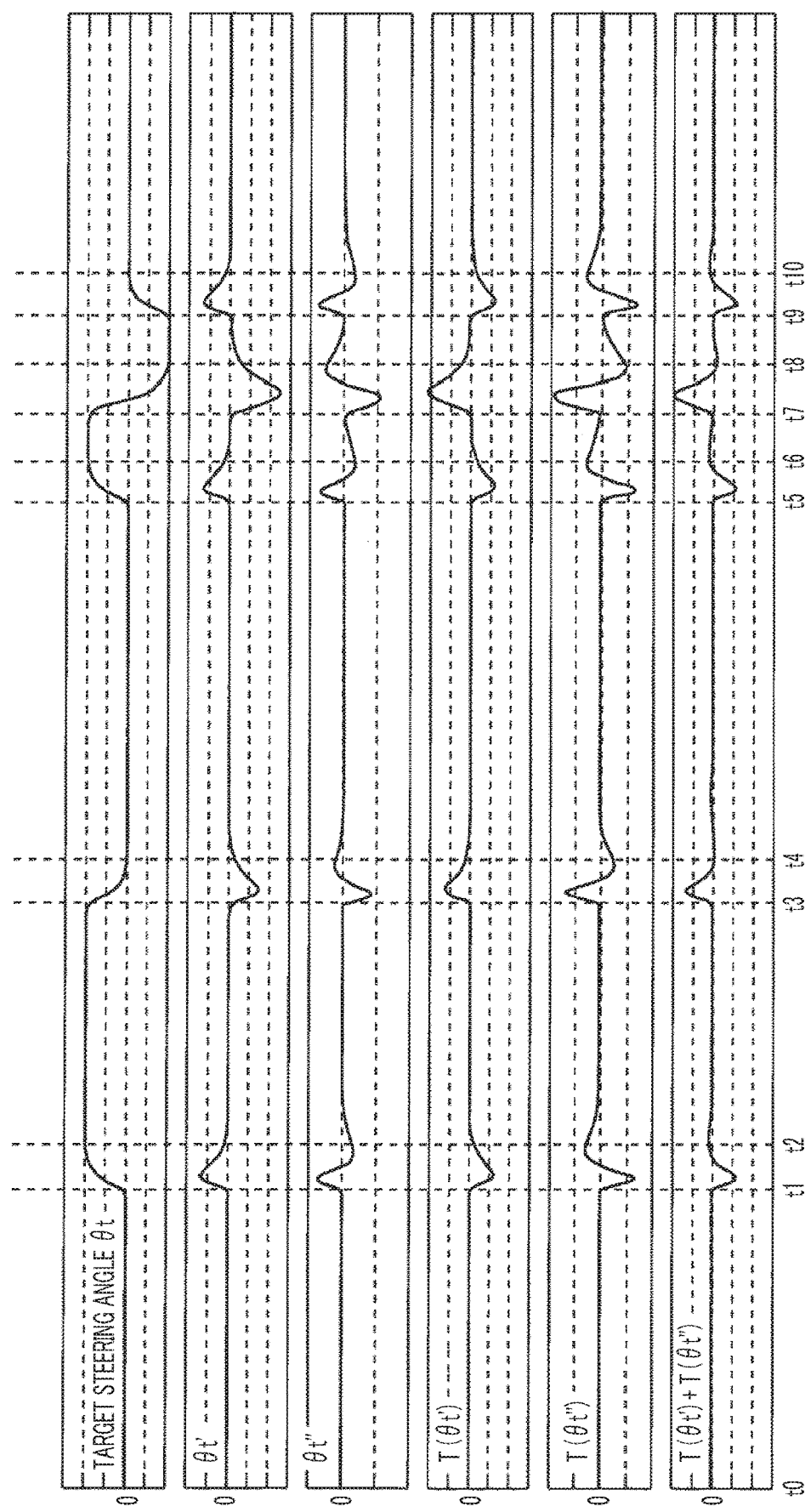
FIG. 3 is a timing chart for describing a relationship between a target steering angle θt, which is a command value of steering assistance control and inertia torque $T(\theta t')+T(\theta t'')$.

FIG. 3 is a timing chart for describing a state when the vehicle 34 travels along the route shown in FIG. 2 under the steering assistance control. Specifically, the uppermost stage of FIG. 3 shows the waveform of a target steering angle θt that is calculated by the steering assistance control. The ECU 22 provides a command value according to the target steering angle θt to the steering actuator 20, and the steering actuator 20 controls the steering angle for the steering target wheels 18 to the target steering angle θt according to the command value. Hereinafter, for convenience of description, it is assumed that the steering angle for the steering target wheels 18 coincides with the target steering angle θt during the execution of the steering assistance control.

In the device of this embodiment, when the target steering angle θt changes, the change is reflected in both the steering target wheels 18 and the steering wheel 10. At this time, due to the inertia of the steering wheel 10, inertia torque T that is expressed by the following expression acts on the steering shaft 12.

$$T = -k*\theta t - C*(\theta t') - I*(\theta t'') \qquad (1)$$

In the expression (1), I is a moment of inertia of the steering wheel 10. C is a coefficient of viscosity associated with the rotation of the steering wheel 10. k is a spring constant in a torsion direction that is shown by a rotational coefficient of the steering wheel 10. θt' is a time differential value of the target steering angle θt, that is, target steering angular velocity. Further, θt'' is a twice time differential value of the target steering angle θt, that is, target steering angular acceleration.

k of the expression (1) can be substantially ignored. Therefore, in this embodiment, the inertia torque is expressed by the following expression.

$$\begin{aligned} T &= -C*(\theta t') - I*(\theta t'') \qquad (2) \\ &= -T(\theta t') - T(\theta t') \end{aligned}$$

Hereinafter, T(θt') is referred to as "angular velocity torque", and T(θt'') is referred to as "angular acceleration torque".

The second stage and the third stage of FIG. 3 respectively show the waveforms of the steering angular velocity θt' and the steering angular acceleration θt". Further, the fourth stage and the fifth stage respectively show the waveforms of the angular velocity torque T(θt") and the angular acceleration torque T(θt"). Then, the lowermost stage of FIG. 3 shows the waveform of the inertia torque T.

In FIG. 3, time t0 to time t1 correspond to the straight road appearing at the beginning of the traveling route. During the period from time t0 to time t1, the target steering angle θt does not change, and therefore, the inertia torque T=−T(θt')−T(θt") is also maintained at zero. Time t1 to time t2 correspond to a period in which the vehicle 34 enters the turning road and the target steering angle θt is increased to an angle that is needed for turning. During the period from time t1 to time t2, as shown in the lowermost stage of FIG. 3, the inertia torque T temporarily decreases and increases.

After time t2, during the traveling on the turning road, the target steering angle θt is stable. Therefore, during the traveling on the turning road, the inertia torque is maintained almost at zero. Time t3 to time t4 correspond to a period in which the target steering angle θt is returned to zero as the vehicle 34 escapes the turning road. At this time, the inertia torque T is generated in the direction opposite to the direction at the time of the entry into the turning road as the steering wheel 10 is returned to a neutral position.

Similarly, during the period from time t5 to time t6, the inertia torque T associated with the entry into the S-shaped road is generated. In the period from time t7 to time t8, the inertia torque T associated with switching in the S-shaped road is generated. Then, in the period from time t9 to time t10, the inertia torque T associated with the escape from the S-shaped road is generated.

As described above, while the steering assistance control is executed in the vehicle 34, the inertia torque T acts on the steering shaft 12 in an area where the curvature of the road changes. Then, the influence of the inertia torque T is also reflected in the sensor torque.

As described above, the ECU 22 cancels the steering assistance control when the steering torque sensor 14 detects torque satisfying the cancellation condition. In the period in which the inertia torque is not generated, the sensor torque coincides with the steering torque by the driver. On the other hand, in the period in which the inertia torque is generated, the sum of the steering torque by the driver and the inertia torque becomes the sensor torque. For this reason, when the same cancellation condition is used in both the periods, in the period in which the inertia torque is generated, a situation can occur where the cancellation condition is established solely by input of slight steering torque.

On the other hand, in this embodiment, the ECU 22 acquires information on the road extending in the traveling direction of the vehicle 34 in the process of the steering assistance control and can calculate the target steering angle θt, based on the information. When the target steering angle θt is calculated in time series, it is possible to calculate the steering angular velocity θt' and the steering angular acceleration θt". Then, when the steering angular velocity θt' and the steering angular acceleration θt" are known, it is possible to calculate the angular velocity torque T(θt') and the angular acceleration torque T(θt") and predict the inertia torque T.

In this embodiment, the inertia torque T that is generated according to the advance of the vehicle 34 is predicted in advance during the execution of the steering assistance control, and the cancellation condition of the steering assistance control is appropriately switched based on the predicted inertia torque T. Specifically, during the period in which generation of significant inertia torque T is not predicted (for example, from time t0 to time t1 in FIG. 3), a first condition using a standard threshold value as a cancellation threshold value is set as the cancellation condition. During the period in which generation of large inertia torque T exceeding the reference value is predicted (for example, from time t1 to time t2 in FIG. 3), a second condition having an establishment condition that is stricter than in the first condition is set as the cancellation condition.

When the cancellation condition is set as described above according to the inertia torque T, it is possible to avoid the steering assistance control being canceled in response to slight steering torque during the period in which the inertia torque T is generated. Hereinafter, the contents of processing that is executed by the ECU 22 in order to appropriately cancel the steering assistance control, including a change in the cancellation condition, will be described in detail with reference to FIG. 4 to FIG. 7.

Cancellation Condition of Embodiment

Figure 4:
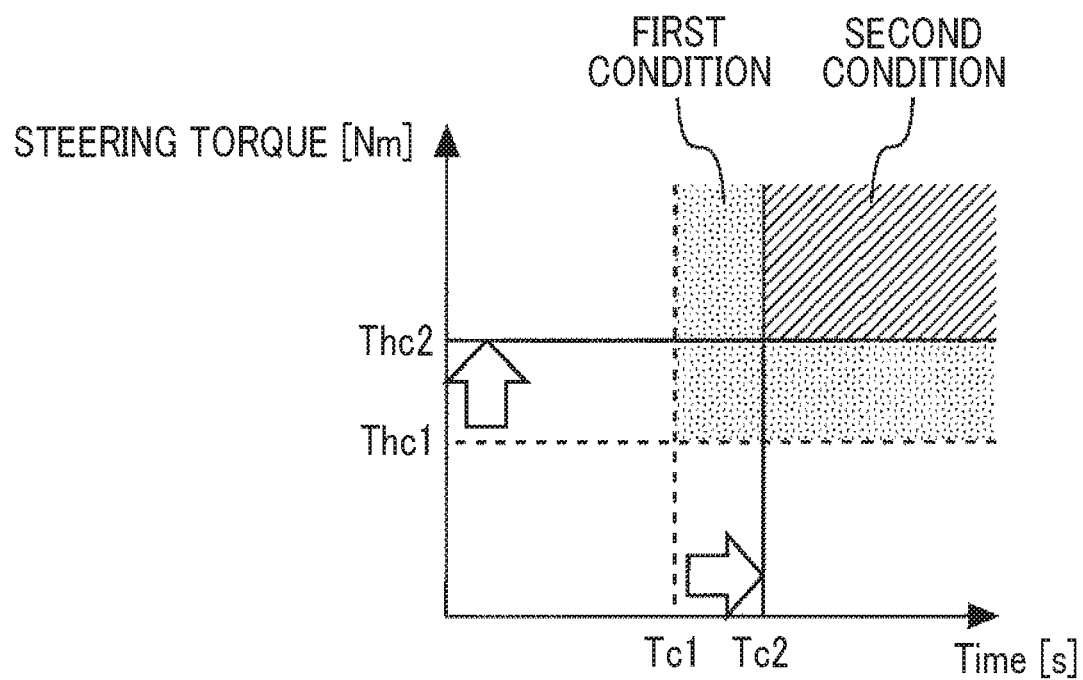
FIG. 4 is a diagram for describing a cancellation threshold value and a cancellation threshold time that determine a cancellation condition of the steering assistance control.

FIG. 4 is a diagram for describing a cancellation threshold value Thc and a cancellation threshold time Tc that determine the cancellation condition of the steering assistance control. The vertical axis in FIG. 4 represents the cancellation threshold value Thc that is compared with the sensor torque. A standard threshold value Thc1 that is used in the first condition and a large threshold value Thc2 that is used in the second condition are shown on the vertical axis in FIG. 4. The horizontal axis in FIG. 4 represents the cancellation threshold time Tc that is compared with an establishment time of a state where the steering torque exceeds the cancellation threshold value Thc. A standard threshold time Tc1 that is used in the first condition and a long threshold time Tc2 that is used in the second condition are shown on the horizontal axis in FIG. 4.

In a case where the first condition is used as the cancellation condition, whether or not the following conditions are established is determined.

(1) Whether or not the sensor torque exceeds the standard threshold value Thc1

(2) Whether or not a state where the output of the steering torque sensor exceeds Thc1 continues beyond the standard threshold time Tc1

In a case where both the conditions are established, a determination that significant steering torque has been input by the driver is made, and the establishment of the cancellation condition is acknowledged.

In a case where the second condition is used as the cancellation condition, whether or not the following conditions are established is determined.

(1) Whether or not the sensor torque exceeds the large threshold value Thc2

(2) Whether or not a state where the output of the steering torque sensor exceeds Thc2 continues beyond the long threshold time Tc2

In a case where both the conditions are established, a determination that significant steering torque has been input by the driver is made, and the establishment of the cancellation condition is acknowledged.

In the second condition, the large threshold value Thc2 larger than the standard threshold value Thc1 is used. For this reason, an output larger than the sensor output that is needed for the establishment of the first condition is needed for the establishment of the second condition. Therefore, the second condition needs an establishment condition stricter than that of the first condition. In the second condition, the long threshold time Tc2 longer than the standard threshold time Tc1 is used. For this reason, for the establishment of the second condition, the sensor torque needs to maintain a large value over a time longer than the time that is needed for the establishment of the first condition. Also in this respect, it is more difficult for the second condition to be established than the first condition.

When the second condition is used as the cancellation condition in the period in which the significant inertia torque is generated, it is possible to avoid the sensor torque exceeding the cancellation threshold value (the large threshold value Thc2) solely by input of slight steering torque. Even though the sensor torque temporarily exceeds the cancellation threshold value due to the influence of the inertia torque, when the steering torque is small, the state does not continue over the long threshold time Tc2. For this reason, according to the second condition, it is possible to avoid the cancellation condition being unjustly established due to the influence of the inertia torque in a situation where the significant inertia torque is generated.

On the other hand, the standard threshold value Thc1 and the standard threshold time Tc1 of the first condition are set to values at which the cancellation condition is established when the steering torque in which steering intervention is intended is input. For this reason, when the first condition is set as the cancellation condition in the period in which the inertia torque exceeding the reference value is not generated, the steering assistance control can be canceled as intended by the driver.

Processing by ECU

Figure 5:
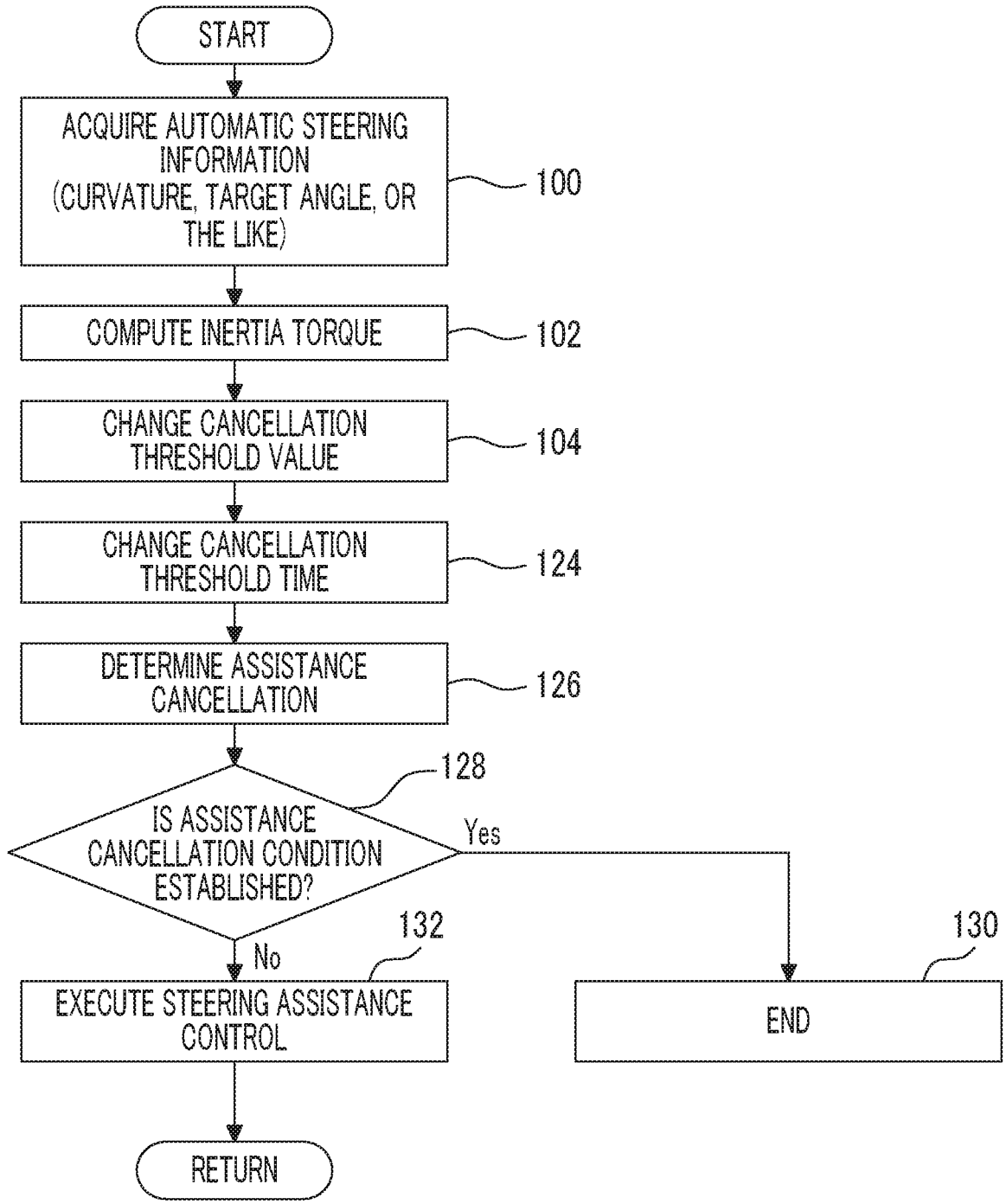
FIG. 5 is a flowchart of a main routine that is executed in the embodiment of the disclosure.

FIG. 5 is a flowchart of a main routine that is executed by the ECU 22 in order to realize the function. The routine shown in FIG. 5 is repeatedly executed in a predetermined period after the driver of the vehicle is instructed to execute the steering assistance control.

When the routine shown in FIG. 5 is started, automatic steering information needed for the execution of the steering assistance control is acquired (step 100). Here, first, the curvature of the road extending in the traveling direction of the vehicle 34 is acquired based on map information or the like. More specifically, the curvature of the road a predetermined distance (for example, 30 m) ahead of the vehicle 34 is acquired. The target steering angle θt for causing the vehicle 34 to travel along the curvature is calculated.

The inertia torque T of the steering wheel 10 is computed according to the expression (2), based on the target steering angle θt calculated in step 100 (step 102). According to the processing described above, it is possible to predict the inertia torque T that is generated when the vehicle 34 has reached a predetermined distance (for example, 30 m) ahead of the vehicle 34.

Figure 6:
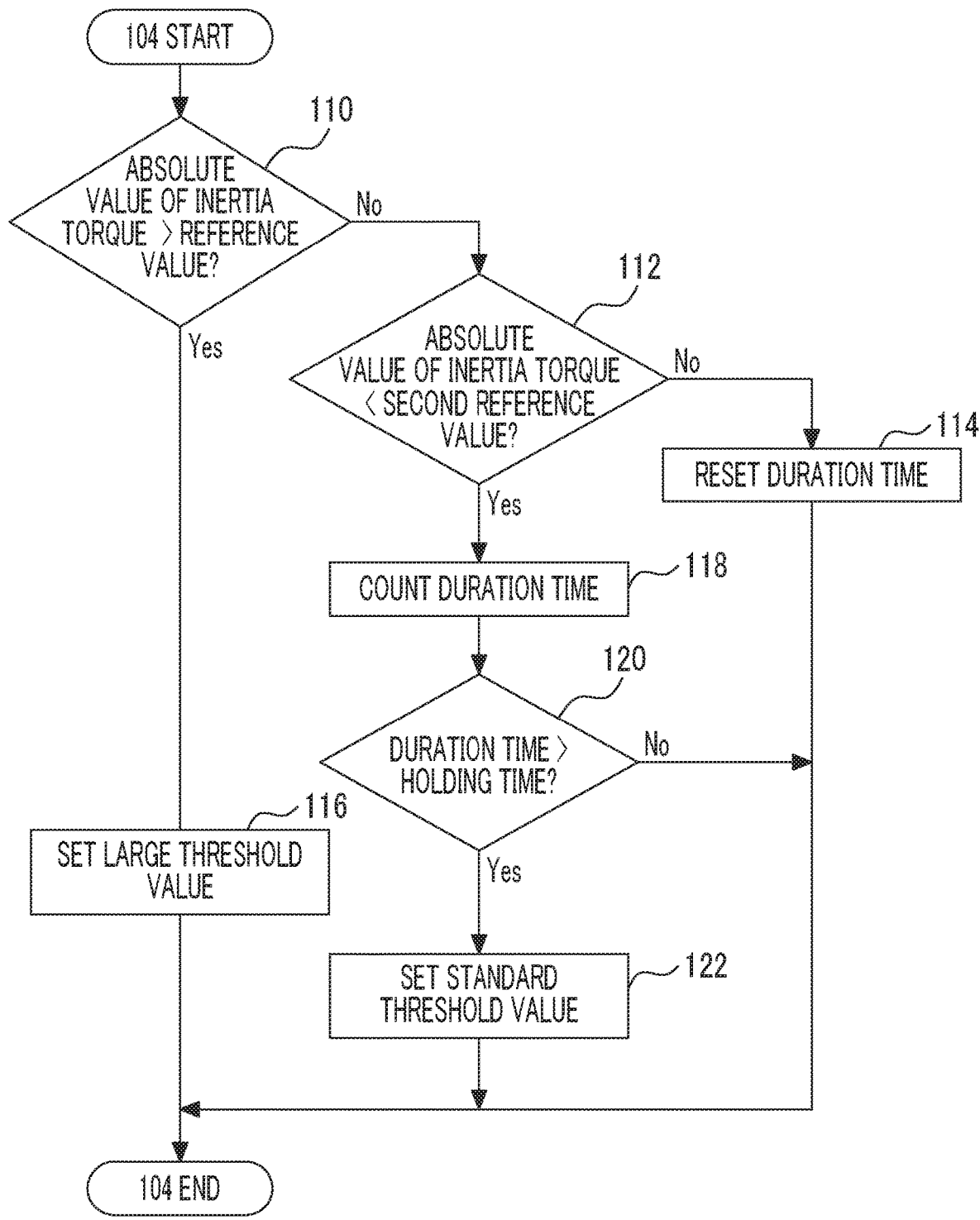
FIG. 6 is a flowchart of processing that is executed in step 104 shown in FIG. 5.

Processing of changing the cancellation threshold value is performed (step 104). FIG. 6 shows a flowchart of processing that is executed in step 104. The processing in step 104 proceeds along the flowchart shown in FIG. 6.

In the flowchart shown in FIG. 6, first, whether or not the absolute value of a predicted value of the inertia torque T acquired in step 102 exceeds the reference value is determined (step 110).

For example, in a case where the vehicle 34 is traveling on a straight road, the inertia torque T having an absolute value that exceeds the reference value is not generated, the determination described above is denied. In this case, next, whether or not the absolute value of the predicted value of the inertia torque T falls below a second reference value is determined (step 112). The second reference value is a determination value for determining whether or not the absolute value of the inertia torque T that has once risen has decreased to a small value. In this embodiment, the second reference value smaller than the reference value is set and a reduction in the absolute value of the inertia torque T is determined. However, a determination that the absolute value of the inertia torque T has decreased to a small value may be made when the absolute value becomes equal to or less than the reference value, without providing the second reference value. In this case, step 112 can be omitted.

In a situation in which the vehicle 34 is traveling on a straight road and the absolute value of the inertia torque T has not yet risen, the determination of step 112 is also denied as a matter of course. In this case, after a count value of a duration time (described later) is reset (step 114), the processing shown in FIG. 6 is ended.

In a stage in which the vehicle 34 reaches a turning road or an S-shaped road, there is a case where the absolute value of the predicted value of the inertia torque T rises to a value exceeding the reference value. In this case, the condition in step 110 is established, and thus the large threshold value Thc2 is set as the cancellation threshold value (step 116).

After the vehicle 34 enters the turning road or the S-shaped road, the absolute value of the inertia torque T also decreases to a small value as the target steering angle θt approaches a stable value. While the absolute value of the inertia torque T still exceeds the second reference value in the process of the decrease described above, the determination in step 112 is denied. In this case, the processing shown in FIG. 6 is ended while the cancellation threshold value is maintained at the large threshold value Thc2, by way of the processing in step 114.

When the target steering angle θt converges to a value matching the curvature of the curve and the absolute value of the inertia torque T decreases to a sufficiently small value, in step 112, a determination that the absolute value falls below the second reference value is made. In this case, the duration time of the state is counted (step 118).

Whether or not the duration time exceeds a holding time is determined (step 120). The "holding time" that is used in step 120 is a time when the second condition should be maintained as the cancellation condition of the steering assistance control after the absolute value of the inertia torque T that has once risen decreases to a small value. In a certain period after the target steering angle θt changes greatly, there is a case where the inertia torque T fluctuates. In order not to erroneously determine the cancellation of the steering assistance, also in the period described above, it is desirable that the second condition having a strict establishment condition is set as the cancellation condition.

In this embodiment, in a case where the determination in step 120 is not established, thereafter, the processing shown in FIG. 6 is promptly ended, and the second condition is maintained as the cancellation condition. When the duration time exceeds the holding time, the standard threshold value Thc1 is set as the cancellation threshold value and the cancellation condition is returned to the first condition (step 122).

The description will be continued with reference to FIG. 5 again. In the routine shown in FIG. 5, when the processing in step 104 is ended, processing of changing the cancellation threshold time Tc is performed (step 124). The processing of changing the cancellation threshold time Tc is performed in the same manner as the processing of changing the cancellation threshold value Thc, that is, the processing shown in FIG. 6. Specifically, when a determination that the absolute value of the predicted value of the inertia torque T exceeds the reference value is made, the long threshold time Tc2 is set as the cancellation threshold time Tc (refer to step 110 and step 116). Thereafter, when a state where the absolute value of the predicted value of the inertia torque T falls below the second reference value continues beyond the holding time, the cancellation threshold time Tc is returned to the standard threshold time Tc1 (refer to steps 112 to 122).

Figure 7:
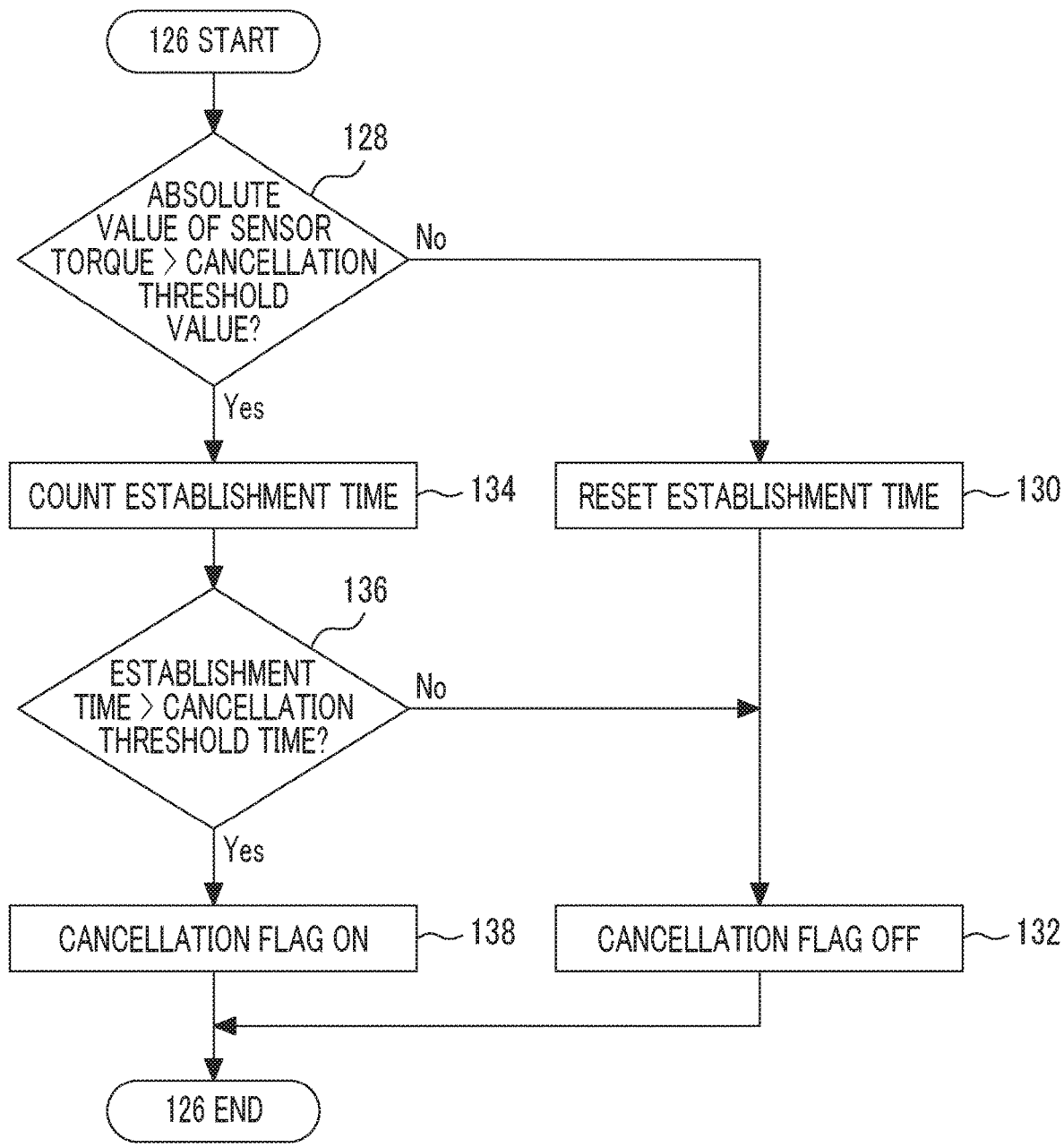
FIG. 7 is a flowchart of processing that is executed in step 126 shown in FIG. 5.

When the processing described above is ended, the assistance cancellation determination is executed (step 126). FIG. 7 shows a flowchart of the processing that is executed in step 126. The processing in step 126 proceeds along the flowchart shown in FIG. 7.

In the flowchart shown in FIG. 7, first, whether or not the absolute value of the sensor torque corresponding to the output of the steering torque sensor 14 exceeds the cancellation threshold value Thc is determined (step 128). Specifically, under the first condition, the absolute value of the sensor torque is compared with the standard threshold value Thc1. Under the second condition, the absolute value of the sensor torque is compared with the large threshold value Thc2.

In a case where a determination that the absolute value of the sensor torque does not exceed the cancellation threshold value Thc is made, a determination that the steering intervention by the driver has not occurred can be made. In this case, first, the count value of the establishment time (described later) is reset (step 130). A cancellation flag is turned OFF (step 132). When the processing described above is ended, the current processing shown in FIG. 7 is ended.

In a case where the generation of the sensor torque having an absolute value that exceeds the cancellation threshold value Thc is acknowledged in step 128, the establishment time of the state is counted (step 134).

Whether or not the establishment time exceeds the cancellation threshold time Tc is determined (step 136). Specifically, under the first condition, the establishment time is compared with the standard threshold time Tc1. Under the second condition, the establishment time is compared with the long threshold time Tc2.

As a result, in a case where a determination that the establishment time of the state where the absolute value of the sensor torque exceeds the cancellation threshold value Thc does not exceed the cancellation threshold time Tc is made, a determination that the steering intervention by the driver cannot be recognized is made. In this case, after the processing in step 132 is executed, the processing shown in FIG. 7 is ended. On the other hand, in a case where the determination in step 136 is affirmative, a determination that the steering intervention by the driver is generated can be made. In this case, after the cancellation flag is turned ON, the processing shown in FIG. 7 is ended.

In the routine shown in FIG. 5, following the processing in step 126, whether or not the assistance cancellation condition is established is determined (step 128). Specifically, whether or not the cancellation flag of the steering assistance control is ON is determined.

As a result, when the cancellation flag is ON, the execution of the steering assistance control is canceled (step 130). On the other hand, when the cancellation flag is OFF, the execution of the steering assistance control is continued (step 132). As described above, according to the device of this embodiment, in a situation in which generation of the inertia torque T that cannot be ignored is predicted, the cancellation condition of the steering assistance control can be made stricter, compared to a case where generation of the inertia torque T as described above is not predicted. For this reason, according to the device, the steering assistance control can be continued or canceled as intended by the driver even in a situation in which the curvature of the curve changes, without being influenced by the inertia torque of the steering wheel 10.

Modification Examples or the Like of Embodiment

Modification Example 1

In the embodiment described above, after the absolute value of the inertia torque T falls below the second reference value, the holding time for maintaining the cancellation condition at the second condition (the large threshold value Thc2 and the long threshold time Tc2) is set as a fixed value (refer to step 120). Until the absolute value of the inertia torque T that has once risen settles to a sufficiently small value, a longer time is needed as the steering angle generating the inertia torque T becomes larger. For this reason, the holding time for maintaining the cancellation condition at the second condition may be set to a longer time as the curvature of the curve into which the vehicle is going to enter becomes larger or as the target steering angle θt becomes larger.

Modification Example 2

In the embodiment described above, the inertia torque T of the steering wheel 10 is set to the sum of the angular velocity torque T(θt') and the angular acceleration torque T(θt''). However, the disclosure is not limited thereto. For example, the inertia torque T may be estimated based on solely the angular acceleration torque T(θt'') by omitting the angular velocity torque T(θt').

Modification Example 3

In the embodiment described above, the same cancellation condition is applied to the right and left steering torques without considering the direction of the inertia torque T. For example, in a case where the vehicle changes the direction thereof to the left by the steering assistance control, the inertia torque T of the steering wheel 10 acts on the steering shaft 12 as clockwise torque. In the embodiment, in this case, the second condition is uniformly set as the cancellation condition with respect to both the steering torque in the right direction and the steering torque in the left direction.

In a case where the driver intervenes the steering in the right direction, since the direction of the steering torque is the same as the direction of the inertia torque, the output of the steering torque sensor 14 becomes the sum of both the torques. Therefore, as the cancellation condition in the above direction, it is appropriate to set the second condition that is strictly established.

On the other hand, in a case where the driver intervenes the steering in the left direction in a situation in which the clockwise inertia torque is generated, the steering torque is canceled by an amount corresponding to the inertia torque, and the output of the steering torque sensor 14 becomes a value obtained by subtracting the inertia torque from the steering torque. In this case, when the second condition is set, in order to establish the cancellation, steering torque larger than the large threshold value Thc2 by an amount corresponding to the inertia torque is needed. In the point described above, the device of the embodiment shows a characteristic that it is difficult for the assistance control to be canceled when the steering is interposed in the direction opposite to the inertia torque.

The characteristic can be solved, for example, by distinctively setting the same direction cancellation condition that is applied to the steering in the same direction as the inertia torque T and the reverse direction cancellation condition that is applied to the steering in the reverse direction. For example, in a case where the generation of the inertia torque T exceeding the reference value is predicted, the second condition that is strictly established may be set as the same direction cancellation condition and the first condition may be applied as the reverse direction cancellation condition as it is.

Furthermore, as the reverse direction cancellation condition, a third condition that is easier to be established than the first condition may be set. Specifically, the cancellation threshold value Thc of the third condition may be set as a small threshold value Thc3 smaller than the standard threshold value Thc1. The cancellation threshold time Tc of the third condition may be set as a short threshold time Tc3 shorter than the standard threshold time Tc1.

Modification Example 4

In the embodiment described above, both the cancellation threshold value Thc and the cancellation threshold time Tc are set as the cancellation condition of the steering assistance control. However, the cancellation condition may be determined solely by the cancellation threshold value Thc. Specifically, whether or not the cancellation condition is established may be determined based on solely whether or not the absolute value of the sensor torque exceeds the cancellation threshold value Thc.

Modification Example 5

In the embodiment described above, both the cancellation threshold value Thc and the cancellation threshold time Tc are changed according to the presence or absence of the inertia torque T exceeding the reference value. However, the disclosure is not limited thereto. For example, solely the cancellation threshold value Thc may be switched while the cancellation threshold time Tc is fixed. Alternatively, solely the cancellation threshold time Tc may be switched while the cancellation threshold value Thc is fixed.

Modification Example 6

In the embodiment described above, the large threshold value Thc2 is set to a value larger than the standard threshold value Thc1 by a fixed value. However, the method of setting the large threshold value Thc2 is not limited thereto. In step 102 shown in FIG. 5, the inertia torque T can be predicted every moment. The large threshold value Thc2 may be calculated by computing a threshold value addition amount, based on the magnitude of the absolute value of the inertia torque T, and adding the threshold value addition amount to the standard threshold value Thc1. Further, in step 102, the inertia torque T may be predicted with respect to the entire area of a certain section (for example, in a range of 30 m to 50 m) in front of the vehicle. In this case, the large threshold value Thc2 that is used in the section may be calculated using the maximum value of the absolute value of the predicted inertia torque T as the threshold value addition amount. According to the above method, it becomes possible to stably proceed with a cancellation determination without frequently changing the large threshold value Thc2.

Modification Example 7

In the embodiment described above, in addition to the combination of the GPS unit 24 and the map information providing unit 26, the object detection sensor such as the camera 28 is provided as the information providing unit that provides road information. However, the units described above are not always needed to be used together. For example, as the information providing unit, solely the GPS unit 24 and the map information providing unit 26 may be used. Alternatively, solely the object detection sensor such as the camera 28 may be used as the information providing unit.

Modification Example 8

In the embodiment described above, the inertia torque T is calculated from the target steering angle θt and the switching of the cancellation condition is then performed. However, the disclosure is not limited thereto. That is, the inertia torque T of the steering wheel 10 can be inferred to some extent from the curvature or the shape of the road without being calculated from the target steering angle θt.

Figure 8:
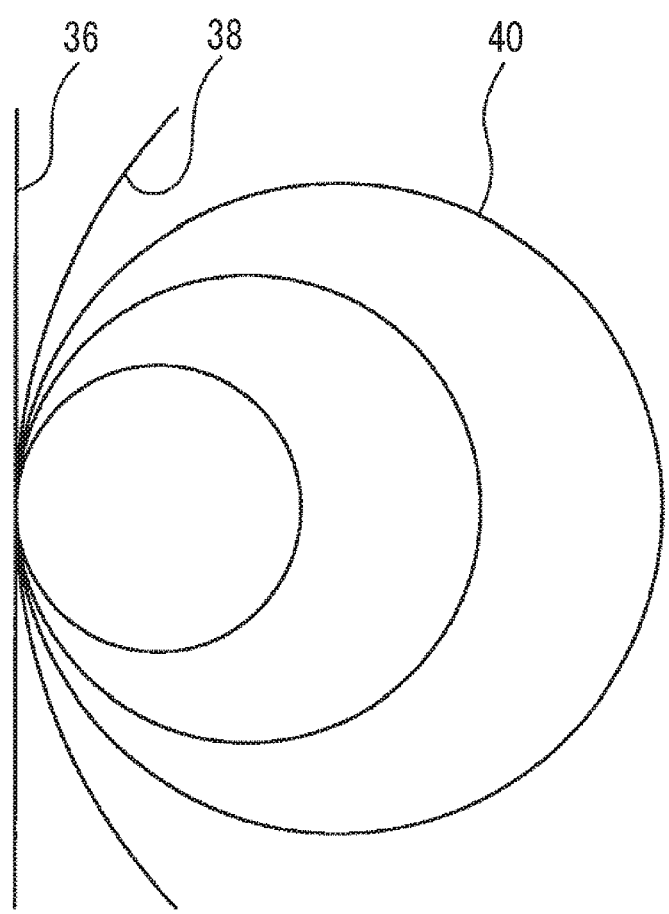
FIG. 8 is a diagram for describing a road shape in which it is difficult for inertia torque of a steering wheel to occur.

FIG. 8 illustrates a road shape in which it is difficult for the steering wheel 10 to generate the inertia torque T. In a monotonous straight road 36 or turning roads 38, 40 as shown in FIG. 8, since the steering angle of the steering wheel 10 does not change, a significant inertia torque T is not generated.

On the other hand, FIG. 9 illustrates a traveling pattern of a vehicle, in which the steering wheel 10 easily generates the inertia torque T. In an area denoted by reference numeral 42 in FIG. 9, a straight road changes to a turning road. In an area denoted by reference numeral 44, the turning road changes to a straight road. An area denoted by reference numeral 46 represents a turning-back portion of an S-shaped road. In the areas 42, 44, 46 described above, a large rotation occurs in the steering wheel 10, and therefore, the inertia torque T having a large absolute value is generated. In the area 46 corresponding to the turning-back portion of the S-shaped road, a larger inertia torque T is generated compared to the other areas 42, 44.

As illustrated with reference to FIG. 8 and FIG. 9, the inertia torque T that is generated by the steering wheel 10 during the execution of the steering assistance control can be inferred to some extent from the shape of a traveling route. For this reason, the inertia torque T is allocated in advance to characteristic shapes of an entry area of a turning road, an escape area from a turning road, a turning-back area of an S-shaped road, and the like, and the inertia torque T may be read from the shape of a traveling route.

Correspondence of Terms

In the embodiment described above, the processing in step 102 and step 110 can be regarded as the "inertia prediction processing" in the aspect of the disclosure. The processing in steps 112 to 122 can be regarded as the "first condition setting processing" in the aspect of the disclosure, and the processing in step 116 can be regarded as the "second condition setting processing" in the aspect of the disclosure.

What is claimed is:

1. A steering assistance device comprising:
a steering wheel to which a driver of a vehicle inputs steering torque;
a steering shaft connected to the steering wheel;
a steering mechanism configured to convert a rotation of the steering shaft into a steering angle for steering target wheels;
a steering actuator configured to drive the steering mechanism such that a steering angle corresponding to a command value is generated;

a steering torque sensor configured to detect torque acting on the steering shaft;

an information providing unit including an object detection sensor configured to provide road information of a scheduled passage area extending in a traveling direction of the vehicle; and an electronic control unit configured to control the steering actuator, based on an output of the steering torque sensor and the road information, wherein the electronic control unit is configured to:
execute steering assistance control that includes computing the command value for causing the vehicle to travel along the scheduled passage area, based on the road information, and providing the command value to the steering actuator, execute assistance cancellation processing that includes canceling execution of the steering assistance control when the output of the steering torque sensor has reached a level that establishes a cancellation condition, execute inertia prediction processing that includes predicting whether or not an inertia torque that is generated by the steering wheel under the steering assistance control is predicted to exceed a reference value, based on the road information of the scheduled passage area, execute first condition setting processing that includes setting a first condition having a standard threshold value as the cancellation condition, in a situation in which the inertia torque is predicted not to exceed the reference value, and execute second condition setting processing that includes setting a second condition having a large threshold value which is larger than the standard threshold value in the first condition as the cancellation condition, in a case where the inertia torque is predicted to exceed the reference value.

2. The steering assistance device according to claim 1, wherein:
the assistance cancellation processing includes determining the cancellation condition has been established in a case where the output of the steering torque sensor exceeds a cancellation threshold value;
the first condition setting processing includes setting the standard threshold value as the cancellation threshold value; and
the second condition setting processing includes setting the large threshold value that is larger than the standard threshold value, as the cancellation threshold value.

3. The steering assistance device according to claim 2, wherein
the large threshold value is a value larger than the standard threshold value by a fixed value.

4. The steering assistance device according to claim 2, wherein:
the inertia prediction processing includes processing of predicting magnitude of the inertia torque, based on the road information; and
the second condition setting processing includes
processing of computing a threshold value addition amount, based on the magnitude of the inertia torque, and
processing of calculating the large threshold value by adding the threshold value addition amount to the standard threshold value.

5. The steering assistance device according to claim 1, wherein:

the assistance cancellation processing includes
processing of determining whether or not the output of the steering torque sensor exceeds a cancellation threshold value, and
processing of determining that the cancellation condition is established in a case where an establishment time during which a state where the output exceeds the cancellation threshold value exceeds a cancellation threshold time;
the first condition setting processing includes processing of setting the standard threshold value as a standard threshold time as the cancellation threshold time; and
the second condition setting processing includes processing of setting the larger threshold value as a long threshold time that is longer than the standard threshold time, as the cancellation threshold time.

6. The steering assistance device according to claim 1, wherein:
the first condition setting processing includes
processing of measuring a duration time of a state where the inertia torque is equal to or less than a second reference value having a value equal to or less than the reference value, in a situation where the inertia torque is predicted not to exceed the reference value, and
processing of determining whether or not the duration time exceeds a holding time;
processing of setting the first condition as the cancellation condition is executed at a point in time when the duration time exceeds the holding time;
the inertia prediction processing includes processing of predicting magnitude of the inertia torque, based on the road information; and
the electronic control unit is configured to execute processing of setting the holding time to be longer as the predicted magnitude of the inertia torque becomes larger.

7. The steering assistance device according to claim 1, wherein
the inertia prediction processing includes
processing of predicting steering angular acceleration that is requested for the vehicle, based on the road information, and
processing of predicting magnitude of the inertia torque, based on the steering angular acceleration.

8. The steering assistance device according to claim 1, wherein:
the cancellation condition includes:
a same direction cancellation condition used for steering torque in the same direction as a direction of the inertia torque, wherein the same direction cancellation condition is used for the second condition, and
a reverse direction cancellation condition used for steering torque in a direction opposite to the direction of the inertia torque, wherein the reverse direction cancellation condition is used for the first condition.

9. The steering assistance device according to claim 8, wherein, for the reverse direction cancellation condition, in the case where the inertia torque is predicted to exceed the reference value, the electronic control unit is configured to execute third condition setting processing of setting a third condition that has a lower threshold value than the standard threshold value of the first condition.

10. The steering assistance device according to claim 1, wherein;

the object detection sensor is configured to detect a target object indicating a boundary of a lane; and the road information includes a detection result of the target object by the object detection sensor.

11. A steering assistance device comprising:
a steering wheel to which a driver of a vehicle inputs steering torque;
a steering shaft connected to the steering wheel;
a steering mechanism that converts a rotation of the steering shaft into a steering angle for steering target wheels;
a steering actuator that drives the steering mechanism such that a steering angle corresponding to a command value is generated;
a steering torque sensor that detects torque acting on the steering shaft;
an information providing unit including an object detection sensor configured to provide road information of a scheduled passage area extending in a traveling direction of the vehicle; and
an electronic control unit programmed to control the steering actuator, based on an output of the steering torque sensor and the road information,
wherein the electronic control unit is further programmed to:
execute steering assistance control that includes computing the command value for causing the vehicle to travel along the scheduled passage area, based on the road information, and providing the command value to the steering actuator,
cancel execution of the steering assistance control when the output of the steering torque sensor has reached a level that establishes a cancellation condition,
predict whether or not an inertia torque that is generated by the steering wheel under the steering assistance control is predicted to exceed a reference value, based on the road information of the scheduled passage area,
in a situation in which the inertia torque is predicted not to exceed the reference value, set a first condition as the cancellation condition, and
in a situation in which the inertia torque is predicted to exceed the reference value, set a second condition as the cancellation condition, wherein the first condition includes (i) the sensor torque exceeding a first threshold value and (ii) an establishment time during which a state where the output exceeds the first threshold value exceeding a first threshold time, the second condition includes (i) the sensor torque exceeding a second threshold value that is larger than the first threshold value and (ii) an establishment time during which a state where the output exceeds the second threshold value exceeding a second threshold time that is longer than the first threshold time.

* * * * *